US009968169B1

(12) United States Patent
Pelton et al.

(10) Patent No.: US 9,968,169 B1
(45) Date of Patent: May 15, 2018

(54) PROTECTIVE CASE FOR ELECTRONIC DEVICE WITH RETRACTABLE HOME BUTTON PROTECTIVE COVER

(71) Applicants: Incipio, LLC, Irvine, CA (US); Jennifer Jo Pelton, Newport Beach, CA (US)

(72) Inventors: Jennifer Jo Pelton, Newport Beach, CA (US); Andy Fathollahi, Corona Del Mar, CA (US); Peter Tu, Long Beach, CA (US)

(73) Assignee: Incipio, LLC, Irvine, CA (US)

( * ) Notice: Subject to any disclaimer, the term of this patent is extended or adjusted under 35 U.S.C. 154(b) by 6 days.

(21) Appl. No.: 15/382,356

(22) Filed: Dec. 16, 2016

(51) Int. Cl.
*B65D 85/00* (2006.01)
*A45C 11/00* (2006.01)
*A45F 5/00* (2006.01)
*A45C 13/00* (2006.01)

(52) U.S. Cl.
CPC ............ *A45C 11/00* (2013.01); *A45C 13/002* (2013.01); *A45F 5/00* (2013.01); *A45C 2011/001* (2013.01); *A45C 2011/002* (2013.01); *A45C 2011/003* (2013.01); *A45C 2200/15* (2013.01)

(58) Field of Classification Search
CPC .............. A45C 11/00; A45C 2011/001; A45C 2011/002; A45C 13/002; A45C 2200/15; A45C 2011/003; B65D 2585/30; B65D 2590/0083; A45F 5/00
USPC ........................ 206/320, 468, 816, 701, 576; 220/811–816; 361/679.57
See application file for complete search history.

(56) References Cited

U.S. PATENT DOCUMENTS

| 8,253,595 B2* | 8/2012 | Yang ........................ H04M 1/18 206/320 |
| 8,453,836 B1* | 6/2013 | Wang ....................... A45C 11/00 206/320 |
| 8,547,695 B2* | 10/2013 | Schroeder ............... B23P 11/00 248/176.3 |
| 9,072,351 B2* | 7/2015 | Schroeder ............... B23P 11/00 |
| 2014/0190841 A1* | 7/2014 | Nash ..................... H05K 9/0045 206/37 |
| 2014/0333831 A1* | 11/2014 | Oh ........................ H04N 5/2254 348/376 |

(Continued)

*Primary Examiner* — J. Gregory Pickett
*Assistant Examiner* — Jenine Pagan
(74) *Attorney, Agent, or Firm* — Manatt, Phelps & Phillips, LLP (57) ABSTRACT

A protective case for a mobile device having a retractable home button protective cover is disclosed. The home button cover is configured to allow the user to reversibly cover and uncover the home button of the mobile electronic device by moving the home button cover from a fully open position to a fully closed position. When in the closed position, the home button cover physically protects or isolates the home button from user interaction. A child-proof locking mechanism is provided to secure and lock the home button in the closed position. In one implementation, the protective case is configured to have a front portion that includes the retractable home button cover and a back portion to which the front portion is reversibly secured. The front portion is configured to retain the mobile device for insertion into the back portion. Various aspects of the construction and implementation of the protective case and the home button mechanism and its use are disclosed.

13 Claims, 11 Drawing Sheets

(56) References Cited

U.S. PATENT DOCUMENTS

| | | | | |
|---|---|---|---|---|
| 2015/0059251 A1* | 3/2015 | Rinner | ............. | G06F 1/1656 |
| | | | | 49/465 |
| 2015/0185760 A1* | 7/2015 | Schroeder | ............. | B23P 11/00 |
| | | | | 361/679.58 |
| 2015/0320167 A1* | 11/2015 | Nguyen | ............. | A45C 11/00 |
| | | | | 224/191 |

* cited by examiner

PROTECTIVE CASE FOR ELECTRONIC DEVICE WITH RETRACTABLE HOME BUTTON PROTECTIVE COVER

INCORPORATION BY REFERENCE TO RELATED APPLICATIONS

N/A.

BACKGROUND OF THE INVENTION

Field of the Invention

This invention relates to accessories for electronic devices and more specifically to user removable protective enclosures or cases for mobile electronic devices.

Description of the Related Art

Mobile consumer electronic products, such as smart and cellular phones, computing tablets, MP3/audio/video players, gaming devices and laptops are continuously and rapidly evolving to meet expanding consumer demands. Many such mobile electronic devices include what is commonly referred to as a home button, which is a button on a smartphone or tablet (or other electronic device) that takes the user from a particular application that is in use or running on the device to the home screen or some starting point that allows the user to access another application or settings on the device. Thus, for example, when a video is playing on the electronic device, engaging the home button of that device will typically pause or stop the video and provide the user with a home screen that will allow the user to access other applications or functions on the device, such as the internet browser, photos, text messages, cell-phone, calendar, or contacts. Each such application or function may contain important or confidential personal or business information.

While such home buttons are convenient in that they facilitate a quick and direct means for a user to move from one application to another application or function, the inventors here have recognized that this same advantage can have unintended shortcomings. For example, because such home buttons are often positioned on the face of the touchscreen to allow for convenient user interaction, it is not uncommon for such a home button to be unintentionally engaged and thereby pause, stop or disrupt an application or functionality mid-stream. In addition, the ability to be in a position to access other applications, functions or information on the mobile device by merely engaging a home button makes it more difficult for the owner of the device to protect important or confidential personal or business information from being lost or revealed. These issues are of particular concern, for example, in situations where the device containing such sensitive or confidential information is shared with a third party or a child that does not fully understand the operations and features of the device.

Accordingly, the inventors here have recognized that there is a need for protective cases that can limit access to the home button of an electronic device and thereby limit unintentional or undesirable access to that device.

BRIEF SUMMARY OF THE INVENTION

Disclosed are numerous aspects of a unique and inventive protective case configured to receive, retain and protect a mobile electronic device, such as a smart or mobile phone, a computing tablet, a laptop, an MP3 audio player, a gaming device, or other portable handheld electronic device that includes a user engageable home button, which when depressed or otherwise selected places in the background the particular application that is in current use or running on the device and presents to the user the home screen of the device or some starting point that allows the user to access other applications, functions, or settings on the device.

In one aspect, the protective case includes a retractable home button cover that is configured to allow the user to reversibly cover and uncover the home button by moving the home button cover from a fully open position to a fully closed position. When in the closed position, the home button cover physically protects or isolates the home button from user interaction.

In another aspect, a locking mechanism is provided to lock the home button cover into a fixed closed position. In a preferred implementation, simultaneous coordinated user action is required to unlock and retract the home button cover.

Additional aspects relate to the construction, configuration and implementation of the various components of the case, home button cover, and the locking and unlocking and movement mechanism individually and in combination with one another.

It should be understood that each of the foregoing and various aspects, together with those set forth in the claims and summarized above and/or otherwise disclosed herein, including the drawings, may be combined to support claims for a device, apparatus, system, method of manufacture, and/or use without limitation.

BRIEF DESCRIPTION OF THE DRAWINGS

These and other features, aspects and advantages are described below with reference to the drawings, which are intended to illustrate, but not to limit, the invention. In the drawings, like reference characters denote corresponding features consistently throughout similar embodiments.

FIGS. 3A and 3B are views of the protective case depicted in FIG. 1 with standing on edge and supported by a hinged panel that forms a stand to support the case. FIG. 3A being a top side view and FIG. 3B being a perspective back face view.

Each drawing is generally to scale and hence relative dimensions of the various components can be determined from the drawings.

DETAILED DESCRIPTION OF THE PREFERRED EMBODIMENT

As summarized above and illustrated in the drawings, disclosed herein are various aspects of a protective case for a mobile device. Many of those aspects are summarized above and illustrated in the drawings.

As set forth above, disclosed in FIGS. 1-8B is a protective enclosure or case 100 for a mobile electronic device 200 having a home button 232. The case 100 includes a retractable home button cover 300 that is configured to allow the user to reversibly cover and uncover the home button 232 of the mobile electronic device 200 by moving the home button cover 300 from a fully open position 500 to a fully closed position 600. When in the closed position 600, the home button cover 300 physically protects or isolates the home button 232 from user interaction.

Conventional mobile devices 200, like the Apple iPhone 7® smart phone, which is depicted in the drawings, typically have a front side 210, a back side 220, a left side 250, a right side 260, a top side 270 and a bottom side 280 that define a rectangular shape with rounded corners. The front side 210 is defined by a front surface or face 230 that includes a touchscreen 231, a speaker port 233 near the top end region, and a home button 232 near the bottom end region that is sometimes combined with a biometric finger print sensor such as that marketed by Apple as "Touch ID." In the illustrated Apple iPhone 7® smart phone device the home button 232 is circular, however it should be understood that the home button in other devices may have other shapes including, for example, rectangular, triangular, oval shapes or other shapes or combination of shapes. The back side 220 is defined by a back face 240, which typically includes camera lens and flash components 241, which in the Apple iPhone 7® smart phone depicted is positioned near the top-right side corner region of the device 200.

Other devices, such as those marketed by Samsung, position the camera and/or flash components more centrally on the back face 240. The sides of the devices typically have one or more buttons/switches and ports to facilitate the operation/functionality of the device. For example, in the illustrated Apple iPhone 7® smart phone device, the left side 250 includes volume up/down buttons 251 and a ring/silent switch 253, the right side 260 includes an on/off or sleep/wake button 261, the top side 270 does not have any buttons or ports, and the bottom side 280 includes a lightning connector port 281 and microphone and speaker ports 282. It should be understood that in other devices, the number, nature and position of the ports and buttons/switches may vary. Also, while the case 100 illustrated includes a front and a back portion, other components may be included or variations may be adapted.

As depicted in the drawings, the illustrated embodiment of the case 100 generally comprises two major components: a front portion 110 and a back portion 120. The back portion 120 is configured to receive and protect the back and sides of the device. The front portion 110 includes a perimeter panel 121 that is configured to be reversibly attachable to the back portion 120 via a friction fit tongue and groove connection that is formed along the perimeter mating edges of the front and back portions. The two portions defined by a front face wall 130, a back face wall 140, and left, right, top, bottom side walls 150, 160, 170, 180, respectively, that are dimensioned and configured to correspond to the front, back, left, right, top and bottom sides 210, 220, 250, 260, 270 and 280 of the mobile device 200 so as to encase and protect the device 200 when the device is received within the case 100.

Figure 1:
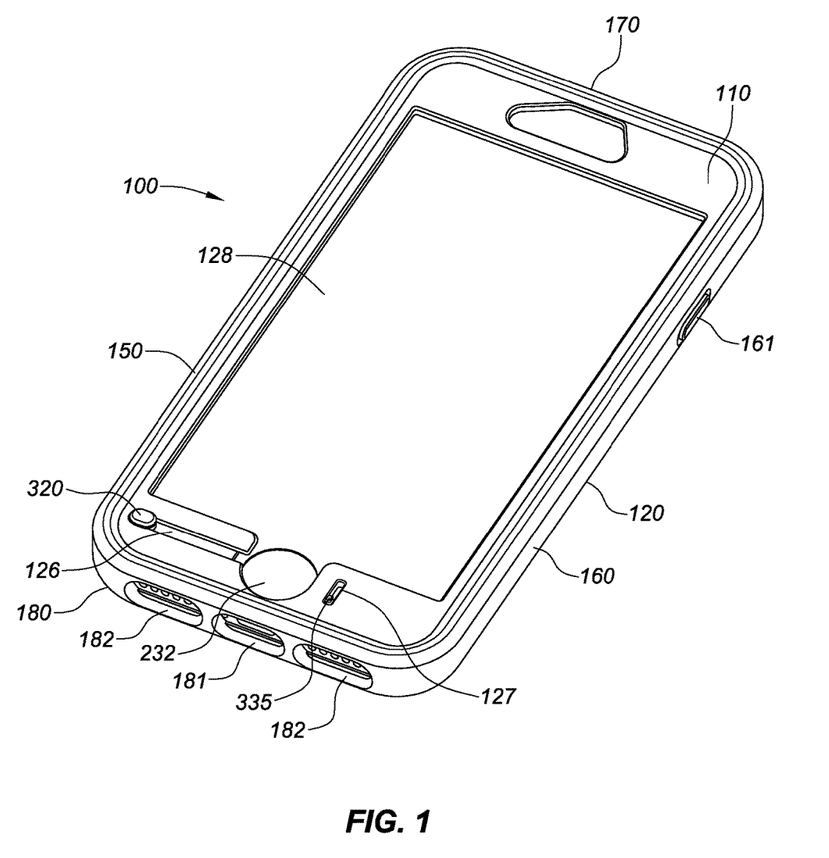
FIG. 1 is a perspective view of a protective case for mobile electronic device having a home button cover with the mobile device inserted in the case.
Figure 2A:
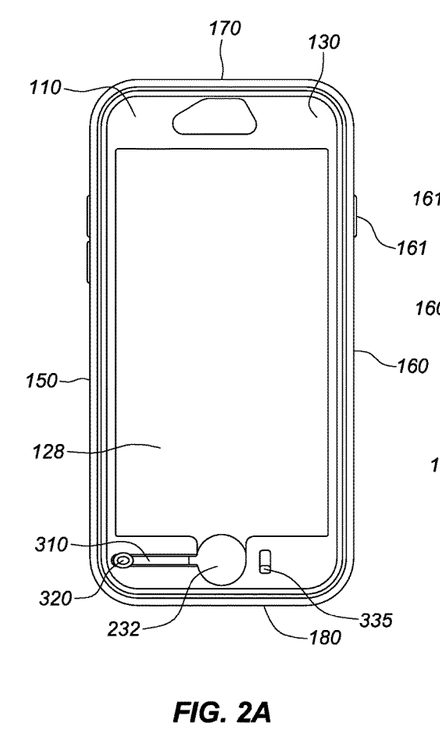
FIGS. 2A-2F are front side, back side, left side, right side, top side and bottom side views of the protective case depicted in FIG. 1.
Figure 2B:
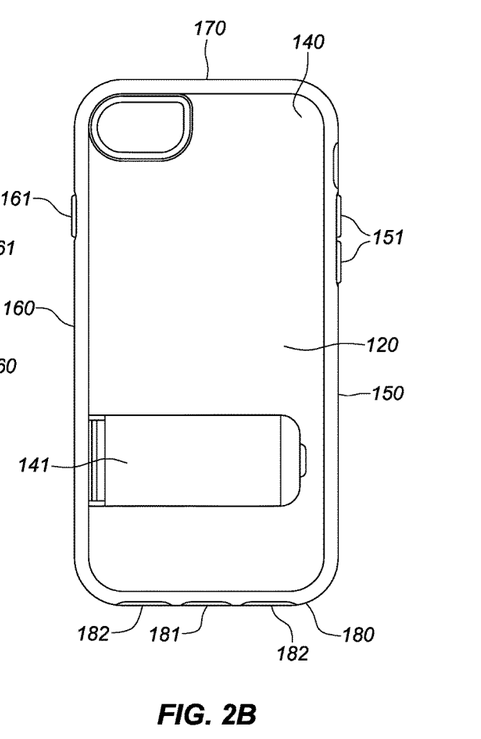
Figure 2C:
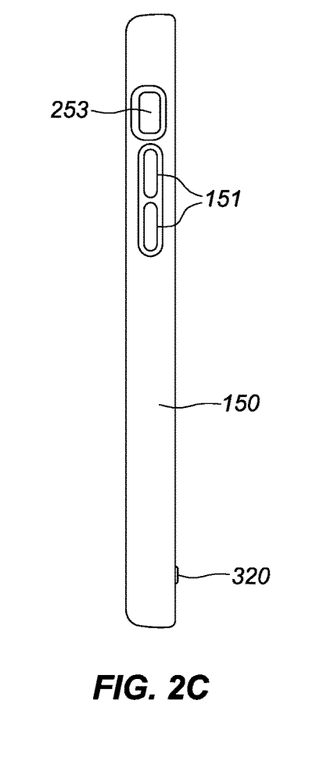
Figure 2D:
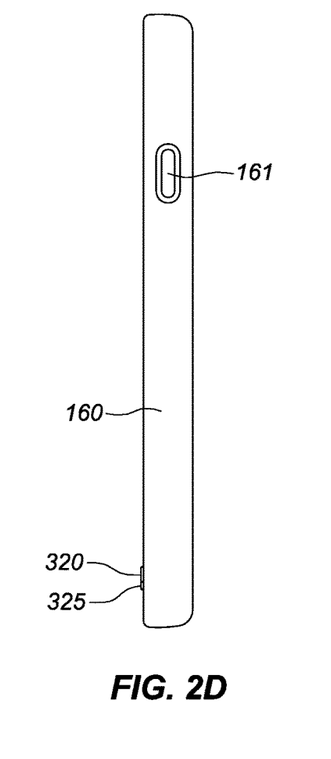
Figure 2E:
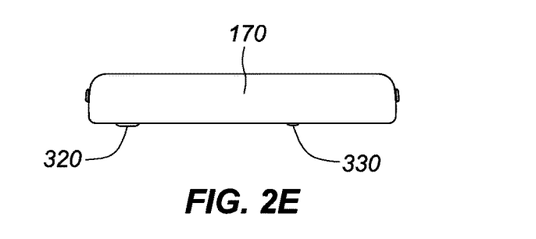
Figure 2F:
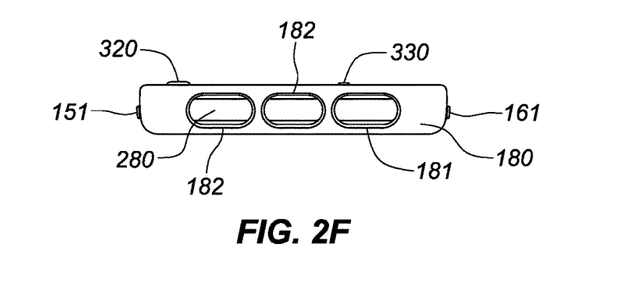
Figure 3A:
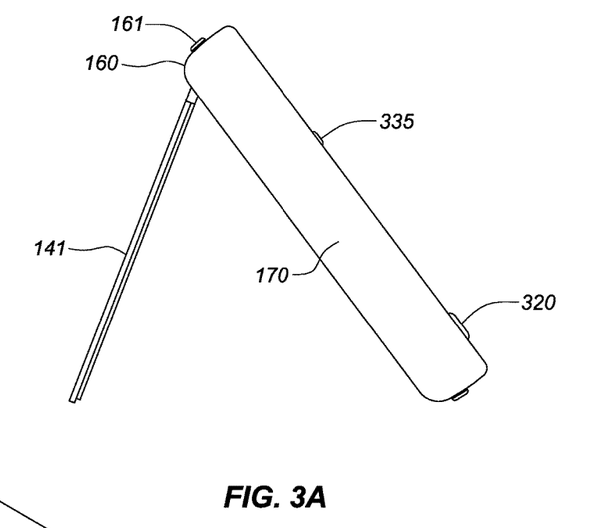
Figure 3B:
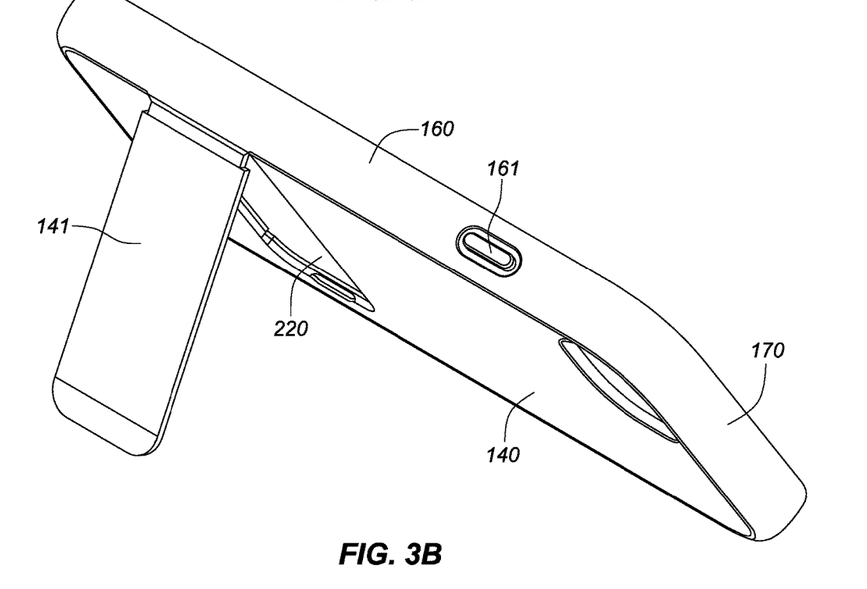
Figure 4A:
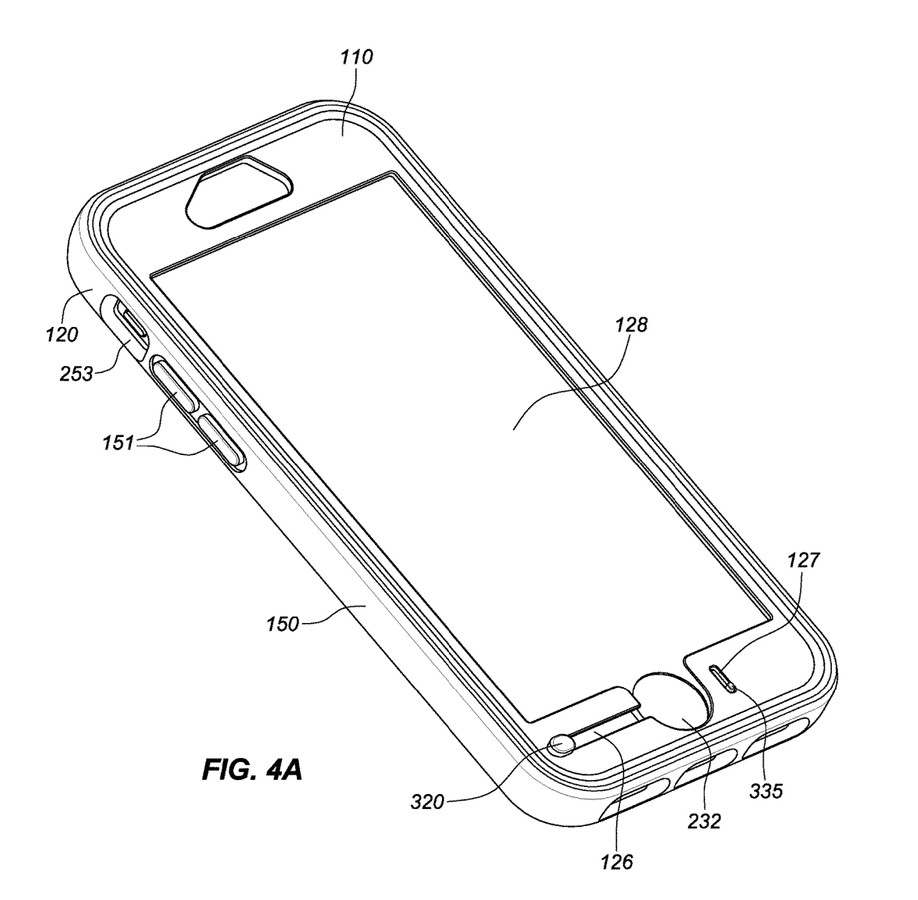
FIGS. 4A and 4B are perspective views of the case depicted in FIG. 1 illustrating the home button cover in the fully open position and the fully closed position, respectively.
Figure 4B:
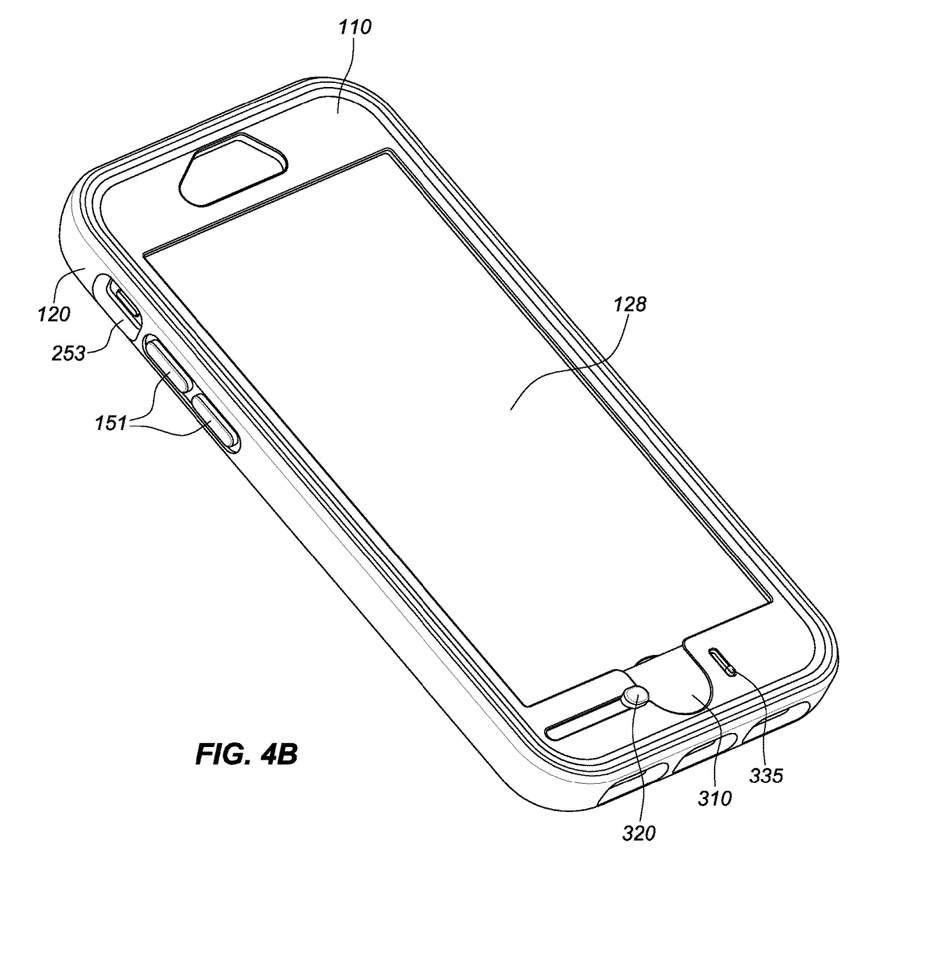

As best illustrated in FIGS. 2B and 3A-3B, the back face wall 140 includes a hinged panel 141 that rotates at hinge 142 away from the adjacent regions of the back face wall 140 so to form a stand capable of supporting the case 100, and the mobile device contained therein, on edge.

The left side wall 150 includes volume up/down buttons 151 that are configured to operatively interface with the volume buttons 251 on the device 200, the right side wall 160 includes an on/off or sleep/wake button 161 that is configured to operatively interface with the sleep/wake button 261 on the device 200, and the bottom side wall 180 includes a plurality of ports 181, 182 that correspond with the connector and microphone/speaker ports 281, 282 on the device 200.

The internal surfaces of the walls 130, 140, 150, 160, 170, 180 of the case 100, which form the front and back portions 110, 120 of the case, define a mobile device compartment 190 dimensioned to receive, support and protect the mobile device 200. Such cases are typically not universal but rather are specifically tailored or configured for a particular brand and model of electronic device. Accordingly, it should be understood that the configuration and dimensions of the walls that form the case will vary depending on the device for which the case is configured to receive.

The case 100 may be formed of any suitable material, such as molded polymer material, metal, wood, and/or a combination of materials. For example, the back portion 120 may be co-molded of polycarbonate (PC) and relatively less rigid or more elastic thermoplastic polyurethane (TPU) with the TPU portions forming all or portions of the side walls 150, 160, 170, 180 and buttons 151, 161 thereon and the PC forming the back face wall 140. The front portion may be formed of the PC.

The perimeter panel 121 of the front portion 110 of the case 100 is defined by inner and outer surfaces 121a and 121b and includes a top end section 122, right and left side sections 123 and 124, and a bottom end section 125. The bottom end section 125 of the perimeter panel 121 includes a first side 125a and a second side 125b, with the first side 125a being configured to reside on one side of the home button 232 and the second side 125b being positioned to reside on an opposing side of the home button 232. In the illustrated embodiment, the first side 125a is configured to reside on the left side of the home button 232 and the second side 125b is configured to reside on the right side of the home button 232.

Figure 5A:
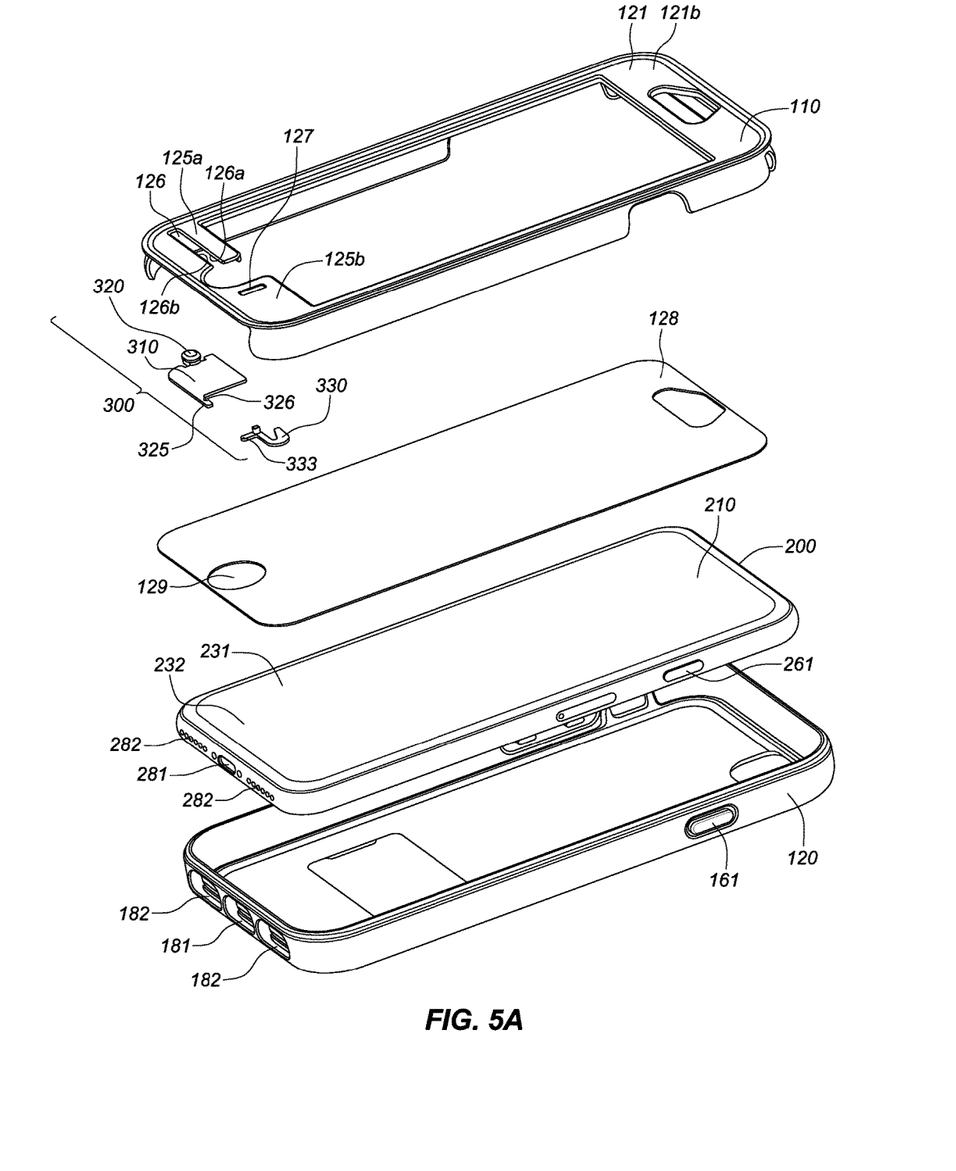
FIGS. 5A and 5B are top side and bottom side exploded views, respectively, of the components of the case depicted in FIG. 1.
Figure 5B:
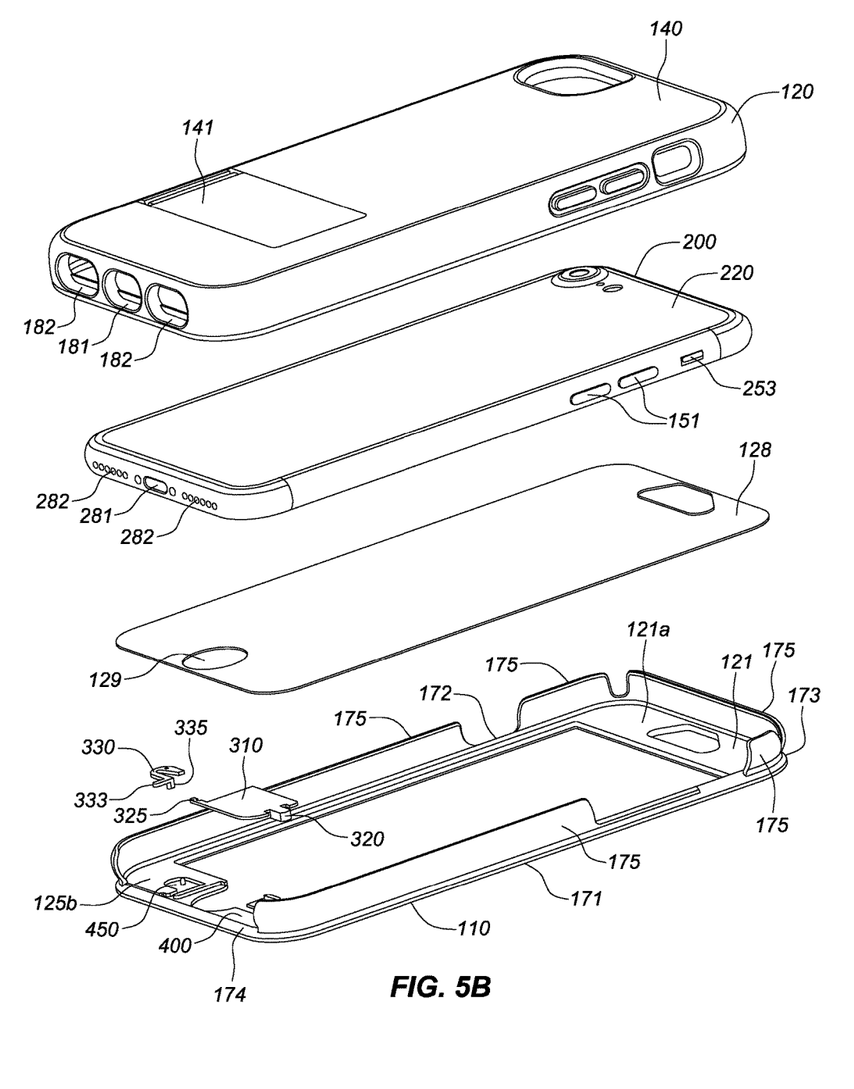
Figure 6A:
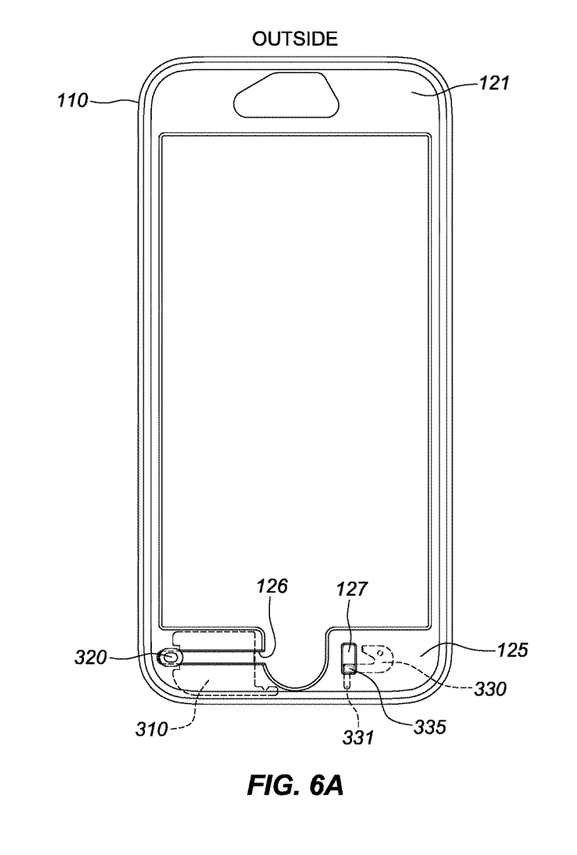
FIGS. 6A and 6B are outside and inside views, respectively, of the front portion of the case depicted in FIG. 1 illustrating the home button mechanism including the home button cover panel and latch components (shaded) in the fully open position depicted in FIG. 4A.
Figure 6B:
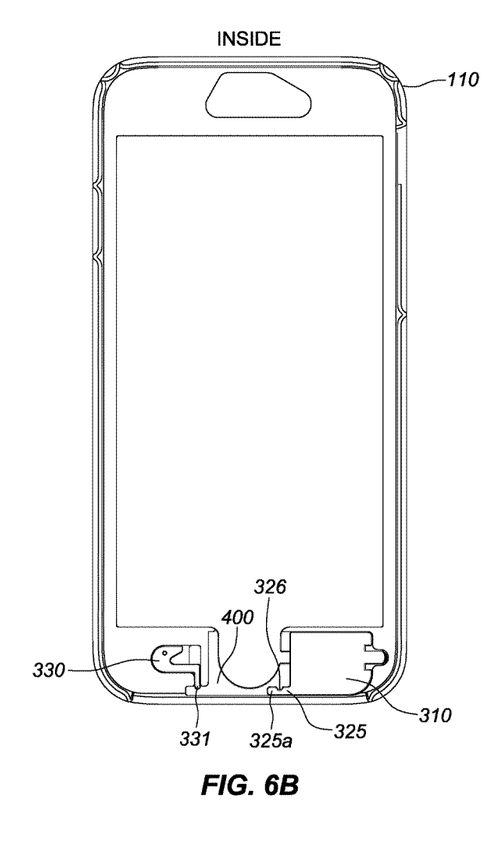
Figure 7A:
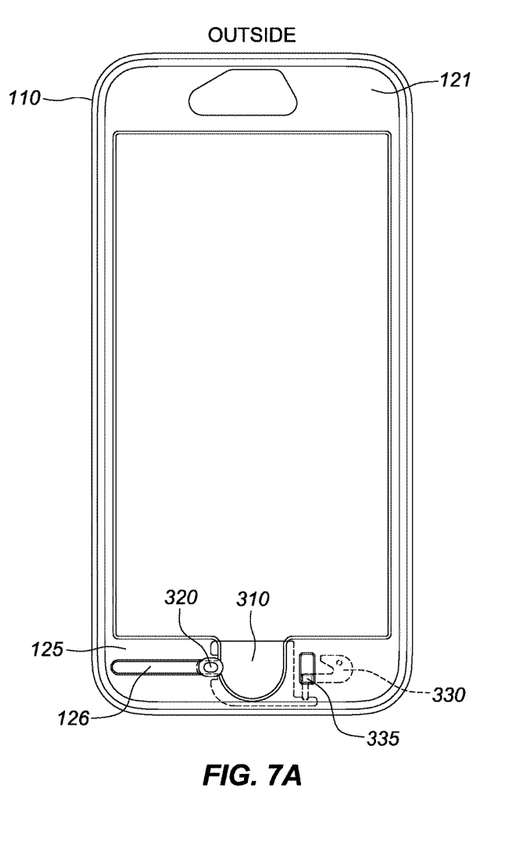
FIGS. 7A and 7B are outside and inside views, respectively, of the front portion of the case depicted in FIG. 1 illustrating the home button mechanism including the home button cover panel and latch components (shaded) in the fully closed and locked position depicted in FIG. 4B.
Figure 7B:
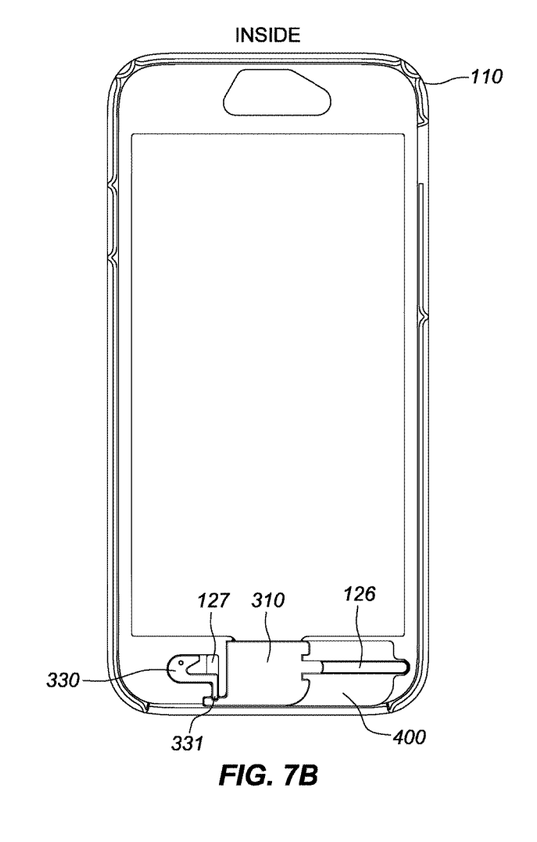
Figure 8A:
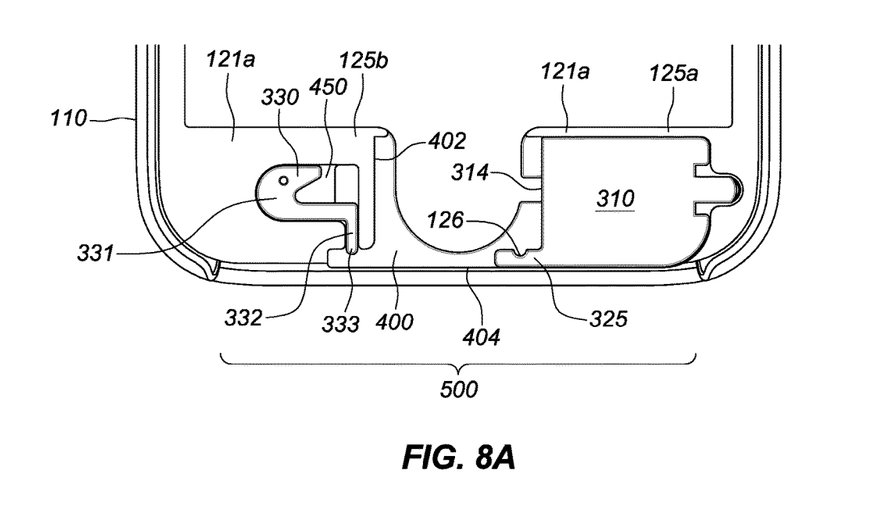
FIGS. 8A and 8B are enlarged partial inside views of the of the front portion of the case depicted in FIG. 1 illustrating the home button mechanism including the home button cover panel and latch components (highlighted) in the fully open position depicted in FIGS. 4A, 6A and 6B and the fully closed and locked position depicted in FIGS. 4B, 7A and 7B, respectively.
Figure 8B:
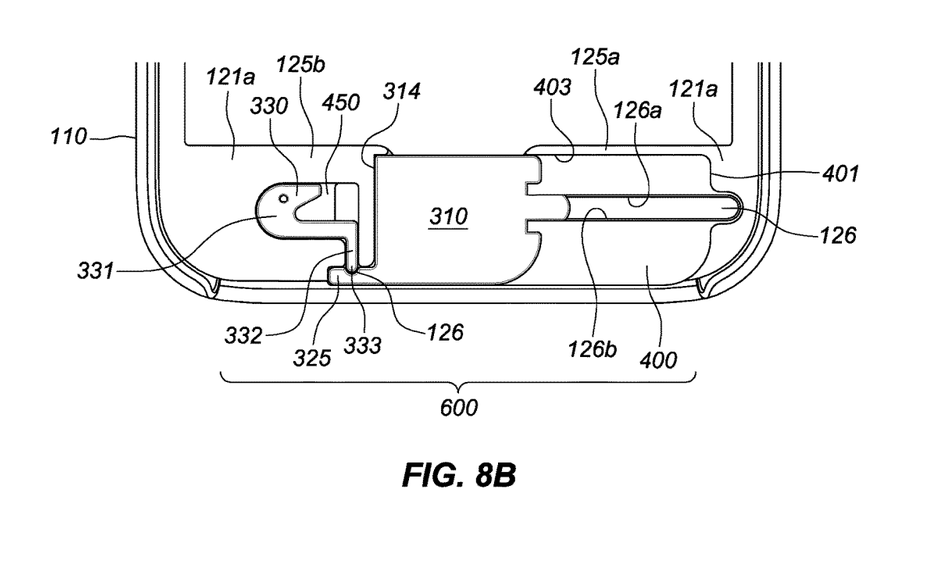

As best illustrated in FIG. 5B, the front portion 110 includes four sides 171, 172, 173, 174. The sides of the front portion 110 are formed as retention tabs 175 that extend in an opposing direction transverse from the front face 130 and dimensioned or otherwise configured to securely retain the mobile device 200 when the mobile device 200 is inserted into the front portion 110. The front portion 110 is reversibly attachable to the back portion 120 via a friction fit tongue and groove connection that is formed along perimeter mating edges including tabs 175 of the front portion 110 and perimeter mating edges of the back portion 120.

The first side 125a of the bottom end section 125 of the perimeter panel includes a first slot 126 formed therein and defined by opposing sides 126a and 126b. The first slot 126 extends in a first direction that is transverse to the left and right sides 150, 160 of the case 100. In the illustrated embodiment, the first slot 126 extends generally perpendicular to the left and right sides 150 and 160 of the case 100. The second side 125b of the bottom end section 125 includes a second slot 127 formed therein and defined by opposing sides 127a and 127b. The second slot 127 extends in a second direction that is generally transverse to the orientation or direction of the first slot 126. Hence, in the illustrated embodiment, the second slot 126 extends longitudinally in a second direction that is transverse to the top and bottom sides 170, 180 of the case 100 and hence transverse to the first direction of slot 126.

In the illustrated embodiment, a front face panel 128, having an inner surface 128a and an outer surface 128b, is positioned underneath the perimeter panel 121 so as to be coupled to the inner surface 121a of the perimeter panel 121 with its inner surface 128a being configured to be in contact with the front face 230 and touchscreen 231 of the mobile device 200 when the device 200 is in the case 100. The front face panel 128 is provided to further protect the front face 230 including the touchscreen display 231 and encase and protect the underside of the home button cover 300 mechanism described in more detail below.

The front face panel 128 is in a preferred implementation formed out of a transparent thin polymer sheet capable of allowing visibility to the touchscreen 231 and communicating interactions between the user and the touchscreen 231 of the mobile device 200. For example, the transparent panel 128 may be formed from a thermo plastic polyester such as a thin sheet of polyethylene (PET or PETP) and/or other suitable material. It should be understood that, while in the illustrated embodiment, the panel 128 is configured to extend across the entire touchscreen display 231 of the device 200, other implementations may not include a panel 128 at all, or may include a panel 128 that only extends around the perimeter panel 121 or sub-regions thereof such as only underneath the bottom end section 125 to facilitate protection and enclosure of the underside of the home button cover 300 mechanism. It should also be understood that while panel 128 is described as being transparent, it may, in other implementations, be semi-transparent and/or opaque in one or more regions.

The front portion 110 of the case 100 also includes a home button aperture 129 that extends through the bottom end section 125 of the perimeter panel 121 and transparent panel 128 between the first and second 125a and 125b of the bottom end section 125 of the perimeter. The aperture 129 is positioned and dimensioned to operatively expose the home button interface 232 to the user.

While the aperture 129 is illustrated as extending through the transparent panel 128, it should be understood that, in some implementations, the transparent panel 128 may not exist and, in other implementations, the transparent panel 128 may be formed of a material that would allow operative interaction with the home button interface 232 without the need of an aperture through the transparent panel 128. In the latter implementation, the transparent panel 128 would remain and continue to overlie the home button 232 and the user would be able to interact with the home button interface 232 directly through the panel 128.

In this regard, while the panel 128 is illustrated as a unitary polymer sheet, it should be understood that the panel 128 may be composed of multiple components formed of different materials. For example, the region of the panel 128 that is configured to overlie the home button 232 may formed of a thin elastic polyester film that may be extruded PET such as that sold under the Mylar® trade name by of DuPont™ while the other regions may be formed of thicker less elastic materials. Such thin protective films may be 0.1 to 1 mm in thickness; between 0.03 to 0.5 mm in thickness; between 0.01 to 0.1 mm in thickness; and perhaps more preferably between 0.03 to 0.075 mm in thickness and perhaps even more preferably between 0.036 to 0.05 mm and perhaps even more preferably at 0.05 mm+/−0.01 mm. It is also contemplated that the protective film layer may be 0.01 mm in thickness or less. Such a thin construction is amenable to allow the user to interact with the home button interface 232 directly there-through.

As best illustrated in FIGS. 4A-4B, 6A-6B and 7A-7B, the retractable home button cover 300 is provided on the protective case 100 to allow the user to reversibly cover and uncover the home button 232 by moving the home button cover 300 from a fully open position 500 to a fully closed position 600. When the home button 232 is covered by the home button cover 300, the home button 232 is physically protected or isolated from user interaction. A locking mechanism on the home button cover 300 fixes the position of the home button cover 300 in the closed position 600. In a preferred implementation, simultaneous coordinated user action is required to unlock and retract the home button cover 300 and thereby uncover or retract the home button 232 back into the open position 500.

In the illustrated embodiment, the home button cover 300 comprises a home button protective panel 310 that is locked into a closed position 600 by a latch 330. The home button protective panel 310 includes a front side 310a, a back side 310b, a first end section 313 being opposed to a second end section 314, and a third end section 311 being opposed to a fourth end section 312. The panel 310, in the illustrated embodiment, is generally rectangular with the first and second end sections 313 and 314 being opposed to one another and the third and fourth end sections 311 and 312 also being opposed to one another. It should be understood, however, that the home button protective panel 310 may be of any suitable shape (e.g., rectangular, oval, triangular, or combination thereof etc.) and dimension sufficient to operatively cover the home button 232 of the device.

A user engageable slider 320 is provided to allow the user to operate the home button cover 300. The user engageable slider 320 extends from the front side 310a of the first end section 313 and, in the illustrated embodiment, is unitarily formed with the slider 320 and configured to include notches on opposing sides thereof.

The slider 320 is fitted into the first slot 126 such that the opposing sides of the slots 126a and 126b reside within opposing notches of the slider 320. The sides of the slot 126a and 126b thereby effectively function like tracks that guide the movement of the slider 320 along the longitudinal length of the first slot 126. The slider 320 and slot 126 are dimensioned so that there is an interference fit between the two components, which serves to retain the slider 320 in a fixed relative position within the slot 126 until the user exerts force on the slider 320 to move the slider 320 along the tracked slot 126. The dimensions of the slider 320 and slot 126 may be configured such that the greatest interference between the slot 126 and the slider 320 occurs in the fully open position 500, with less interference as the slider 320 moves toward the fully closed position 600. The degradation and strength of the interference between the slot 126 and the slider 320 component can be configured as desired. For example, it may be stepped and/or uniformly decreased as the slider 320 moves away from the open position 500 toward the closed position 600.

A catch arm 325 is provided that extends (toward the right side of the case 100) from the bottom end region of the second end section 314 of the home button protective panel 310. The catch arm 325 includes an indent or catch 326 at its distal end region 325a. In the illustrated embodiment, the catch arm 325 is unitarily formed with the home button protective panel 310 and, as described in more detail below, the catch 326 is configured to engage a latch 330 which locks it in the closed position 600.

As best illustrated in FIGS. 5B, 6B, 7B and 8A-8B, the home button protective panel 310 is positioned within a first recessed cavity 400 that is formed into the inner surface 121a of the bottom end section 125 of the perimeter panel 121. The recessed cavity 400 is dimensioned to allow the home button protective panel 310 to slide there-within from a first open position 500 to a second fully closed position 600. In the second closed position, the home button protective panel 310 is configured to operatively cover the home button 232. The phrase "operatively cover" as used herein means that the home button cover 300 is configured so that when in the closed position 600 it shields the home button 232 from physical interaction and thereby limits/impairs or entirely precludes user activation of the home button 232.

Notably, the first recessed cavity 400 extends from the left side 125a across the aperture 129 to the right side 125b of the bottom end section 125 of the perimeter panel 121. The recessed cavity 400 is defined by sides 401, 402, 403 and 404, which serve to guide the panel 310 back and forth from the fully open position 500 to the fully closed position 600 and provide a mechanical stop to restrain the panel 310 from moving beyond those desired positions. Configuring the recessed cavity 400 so that it extends to the opposing side of the home button 232 allows the protective panel 310 to fully traverse the home button 232 and be received within the right side 125b of the bottom end section 125 of the perimeter panel 121. Thus, the leading edge formed in the second end section 314 of the panel 310 is concealed and protected underneath the right side 125b of the bottom end section 125.

A latch 330, which includes a front side 330a and a back side 330b, is mounted within a second recessed cavity 450 that is formed into the inner surface 121a to the second side 125b (right side) of the bottom end section 125 of the perimeter panel 121. The second recessed cavity 450 is dimensioned to constrain the latch 330 within a fixed location.

The latch 330 is generally shaped as a capital letter "J" comprising a "U" shape portion 331 at the bottom end and a lever arm 332 at the top having a distal end 333 that in the illustrated embodiment is configured to extend from the second recessed cavity 450 into an adjacent region of the first recessed cavity 400 so as to be positioned to interact with the catch arm 325 and catch 326 extending from the protective panel 310. To further ensure retention of the latch 330 in the proper location and reliable operation of the latch 330, the recessed cavity 450 includes a pin 455 that is position to extend through a hole or aperture 336 in the U shaped portion 331 of the latch 330.

To facilitate user engagement or manipulation with the latch 330, the latch 330 includes a second slider 335 that extends from the front side 330a of the lever arm 332 and is positioned within a second track or slot 127. The second slot 127, which as described above, is oriented in a direction that is generally transverse to the orientation of the first track/slot 126. The second slider 335 is dimensioned and configured to extend through the slot 127 so that it is accessible from the outside of the case 100 and engageable by the user.

When the home button protective panel 310 is moved along the first track/slot 126 to the fully closed position 600, the lever arm 332 is forced out of an extended position (and out of the first recessed cavity 400) into a compressed configuration or position by the leading edge of the catch arm 325, which compresses the constrained J shaped latch 330 upon itself such that the opposing sides of the latch 330 are compressed nearer to one another. When the lever arm 332 is in the compressed configuration or position, it has a bias toward the uncompressed or extended position. As the catch arm 325 continues to be slid or moved toward and into the fully closed position 600, the catch 326 becomes positioned adjacent to the lever arm 332 and the compressed lever arm 332, which is now biased toward the catch arm 325, is provided room to move back toward and extended uncompressed configuration or position such that the distal end 333 of the latch moves into the opening that defines the catch 326, thereby engaging the catch 326 and locking the home button protective panel 310 into the closed position 600 in a position overlying the home button 232.

In the illustrated implementation, simultaneous and coordinated action or force is required to unlock and retract the home button cover 300 from the locked and fully closed position 600. Specifically, in order to unlock and retract the home button cover 300, the user would need to engage and apply force to slider 335 upward toward the top of the case 100 along slot 127 to compress the latch 330, which in turn would move the lever arm 332 into the compressed configuration/position and out of the recess of the catch 326 thereby releasing the catch arm 325. While the lever arm 332 is retained by application of force in the compressed configuration/position, the user would need to also impart or apply force on the home button protective panel 310 slider 320 (in a transverse direction) so that the slider 320 slides along tracks of slot 126 toward the open position 500 and to retract the panel 310. Thus, to unlock and retract the locked and fully closed home button cover 300, the user would need to apply simultaneous force in one direction (upward) on the latch slider 331 and in a transverse direction (toward the left side) on the home button panel slider 320. Such simultaneous and coordinated actions to unlock and retract the home button cover 300 are difficult to perform by young children. Accordingly, such a mechanism can be described as being child-proof.

Thus, in operation, the user inserts the electronic device 200 into the protective case 100 by securing it in the front portion 110 and placing the front portion 110 together with the electronic device 200 retained there-in into the back portion 120. The device is thereby incased within the front and back portions 110, 120 and the retractable home button cover 300 is thereby positioned to operatively cover the home button on the device 200.

When the home button cover 300 is in the open position 500, the home button protective panel 310 is concealed behind the first side 125a of the bottom end section 125 of the perimeter panel 121 and shielded from the mobile electronic device by the front face panel 128 disposed there-between. The home button cover 300 is fixed in an open position by an interference fit between the slider 320 and the tracks or the opposing sides 126a and 126b that define the slot 126. By applying force on the slider 320 the user can push the slider 320 and the home button protective panel 310 to the opposing side (right side) of the case 100 over the home button 232 toward and into a second or fully closed position 600, wherein the catch 326 engages the latch 330 and thereby locks the home button cover 300 closed. Once the home button cover 300 is locked in the fully closed position, simultaneous coordinated application of force is required to unlock and retract the home button cover 300. The home button slide-lock mechanism is therefore childproof or child-safe as such simultaneous and coordinated actions are typically difficult for a young child to accomplish.

The components of the home button cover 300, including the protective panel 310 and latch 330, may be formed of any suitable materials. For example, it is contemplated that the home button components, including the protective panel 310 and latch 330, are constructed of a polymer such as molded PC, other type of polymer, or metallic material.

While the retractable cover mechanisms described herein are disclosed in the context of a home button, it is here contemplated and therefore disclosed that the cover and implementing mechanisms described herein may be employed in a case to cover other types of buttons (e.g., on/off switches or buttons that bring the user to a different screen such as back buttons). Moreover, it is contemplated herein and therefore disclosed that the cover and implementing mechanisms described herein may be employed in a protective case at different locations so as to cover buttons provided in locations other than on the face of the electronic device, such as on the back or sides of the electronic device. Furthermore, it is contemplated herein and therefore disclosed that the cover and implementing mechanisms described herein may be employed in a protective case to cover any type of button that requires engagement by the user, including mechanical/electrical or capacitive interface buttons such as on an interactive touchscreen. Accordingly, claims may be directed to these specific aspects or implementations alone or in combination with other aspects herein disclosed.

Each of the foregoing and various aspects, or teachings herein together with those set forth in the claims and described in connection with the protective case described and summarized above or otherwise disclosed herein including the drawings may be combined to form claims for a device, apparatus, system, method of manufacture, and/or use without limitation.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the various aspects have been shown and described in detail, other modifications, which are within their scope will be readily apparent to those of skill in the art based upon this disclosure. It should therefore be also understood that the scope of this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of claims made in this patent document and any future patent document that relies on this disclosure.

Similarly, this method of disclosure, is not to be interpreted as reflecting an intention that any claim require more features than are expressly recited in that claim. Rather, as the following claims represent, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A protective case for a mobile electronic device having a touchscreen display and a home button, said case comprising:
   a user removable compartment configured to receive and cover said mobile electronic device; and
   a retractable home button cover configured to move back and forth in the case from a fully open position to a fully closed position,
   wherein the home button cover includes a locking mechanism that locks the cover in a fixed position when the cover is in the fully closed position,
   wherein the locking mechanism of the home button cover includes a catch and a latch that is configured to engage the catch and thereby lock the home button cover, and
   wherein the home button cover includes a protective panel that slides along a first slot formed within the case and oriented in a first direction and wherein the latch is compressible along a second slot formed within the case and oriented in a second direction, and wherein said first direction is transversely oriented relative to said second direction.

2. The protective case of claim 1, wherein the locking mechanism of the home button cover is configured to require the application of simultaneous and coordinated action to unlock and retract the home button cover from the fully closed position.

3. The protective case of claim 1, wherein the catch and the latch are mounted within recessed cavities of a front portion of the case.

4. The protective case of claim 1, wherein the catch is configured to extend from a protective panel that is configured to physically shield the home button when the home button cover is in the fully closed position.

5. The protective case of claim 1, wherein the case includes a right side and a left side and the latch is position in a recessed cavity that is configured to reside on the right side of the case.

6. The protective case of claim 1, wherein the first slot and the second slot are configured to be positioned on opposing sides of the home button.

7. The protective case of claim 1, wherein said latch is pinned within a recessed cavity formed within a front portion of the case.

8. The protective case of claim 1, wherein said protective panel slides within a recessed cavity formed within a front portion of the case.

9. The protective case of claim 8, wherein the recessed cavity is configured to extend across the home button so as to reside on opposing sides of the home button.

10. The protective case of claim 1, wherein the protective case is formed of a bottom portion and a front portion, the front portion being configured to overlie the touchscreen of the mobile device and house the home button cover.

11. The protective case of claim 10, wherein the front portion includes a transparent panel that is configured to reside adjacent to the touchscreen display of the mobile device.

12. The protective case of claim 1, wherein the home button cover is configured to include a friction fit that fixes the position of the home button in an open position.

13. The protective case of claim 12, wherein the strength of the friction fit varies depending on the position of the home button cover.

* * * * *